United States Patent

[11] 3,603,227

| [72] | Inventors | Herbert Maronde |
| | | Duesseldorf; |
| | | Karl Heinz Garitz, Neub, both of, Germany |
| [21] | Appl. No. | 743,799 |
| [22] | Filed | July 10, 1968 |
| [45] | Patented | Sept. 7, 1971 |
| [73] | Assignee | Robot Foto und Electronic GmbH & Co. KG |
| | | Dusseldorf-Benrath, Germany |
| [32] | Priority | July 15, 1967 |
| [33] | | Germany |
| [31] | | P 15 97 379.2 |

[54] PHOTOGRAPHIC-MONITORING DEVICE
5 Claims, 3 Drawing Figs.

[52] U.S. Cl. .................................................. 95/1.1,
    95/86;11;18;12;45, 95/11, 95/18, 95/12, 95/45
[51] Int. Cl. .................................................. G03b 17/24
[50] Field of Search .......................................... 95/12, 86,
    11, 18, 1.1

[56] References Cited
UNITED STATES PATENTS
2,736,630  2/1956  Cooper ......................... 346/107
2,998,761  9/1961  Cooper et al. .................. 95/1.1
3,032,766  5/1962  Weaver ......................... 346/107
3,111,886  11/1963 Berning et al. ................. 95/1.1
3,125,936  3/1964  Abell .......................... 95/1.1
3,165,373  1/1965  Scott .......................... 346/107
1,494,724  4/1924  Verschraeghen ................ 95/1.1
2,953,073  9/1960  Birch .......................... 95/1.1
2,907,253  10/1959 McDonald ...................... 95/1.1
3,168,856  2/1965  Norden et al. .................. 95/1.1

Primary Examiner—Samuel S. Matthews
Assistant Examiner—D. J. Clement
Attorney—Darbo, Robertson & Vandenburgh ABSTRACT: A traffic-monitoring camera is removably mounted on a housing with its primary lens extending horizontally above the housing. Within the housing are instruments, e.g., clock, to be simultaneously photographed. The housing has a fixed holder to which a lens mount is adjustably affixed and positioned in the housing. An auxiliary wide-angle lens is secured in the mount and positioned with its optical axis horizontally and symmetrically between the instruments. Mirrors and a tube provide a path for the light rays from the auxiliary lens to the camera field.

PATENTED SEP 7 1971 3,603,227

INVENTORS:
HERBERT MARONDE
KARL HEINZ GARITZ

BY
Darbo, Robertson &
Vandenburgh Attys

PHOTOGRAPHIC-MONITORING DEVICE

BACKGROUND OF THE INVENTION

The present invention relates to a photographic-monitoring device, comprising a camera adapted to photograph the monitored object, having automatic film advance and shutter winding. At the same time the camera also photographs a secondary image of instruments, reflected into the image field by means of an auxiliary objective, said instruments being accommodated in a housing carrying the camera. Devices of the type indicated are used to monitor an action, such as a traffic action or an action in an industrial plant, for which photographic documentary proof is to be provided and which, at the same time, permits recognition of more detailed indications as to the action, for instance, time and date, driving speed or other measured data pertaining to the action, by a secondary image of instruments photographed conjointly therewith. Reflection of a secondary image of instruments, formed by an auxiliary objective, into the camera image field is known per se. With prior art monitoring devices the optical system required for forming and reflecting the secondary image, constitutes a component part of the photographic camera. As the photographic camera must frequently be removed, for instance, for replacement of film, certain difficulties are encountered, when reinserting the camera, in obtaining a precise orientation of the auxiliary objective with respect to the secondary image objectives. With monitoring devices of the type indicated, according to the invention these difficulties are overcome by providing that the auxiliary objective used to form the secondary image, is adjustably mounted in the housing as wide-angle lens with a horizontally disposed optical axis, and the path of rays on the image side is directed to the image field via mirror elements and a tube mounted on the removable camera housing. Thus, also when removing the photographic camera the auxiliary objective remains unchanged in its adjusted position in the housing accommodating the instruments. With an arrangement of the type indicated it is also possible to use a wide-angle lens as auxiliary objective in order to provide a comparatively small-sized housing accommodating the said instruments.

In order to render possible ready universal adjustment of the auxiliary objective, in further modification of the invention the mount of the auxiliary objective is formed with a lateral projection having an opening into which ball cup-shaped clamping elements engage from both sides.

Expediently, the instruments are mounted on housing inserts in a manner such that they are disposed to be symmetrical with respect to the optical axis and angular with respect to each other. Thereby, it is attained, that the instruments are readily accessible and replaceable, if necessary. Though inclination of the instruments with respect to the optical axis results in a slight distortion of the instrument image, being irrelevant in most cases, however, it has the advantage of considerable space saving.

When mounting the photographic camera in this manner on an instrument housing, frequently, difficulties are encountered to operate and read the aperture setting of the camera lens in conventional manner from the front. Expediently, provision is therefore made that a slide is guided on the housing in front of the camera, said slide cooperating with a scale readable from behind, mounted laterally of the camera, and engaging with a fork thereof into the aperture-setting device of the camera.

SUMMARY OF THE INVENTION

The present invention relates to a camera for simultaneously taking a picture of a scene and of specific instruments, which camera is adapted for easy separation and reassembly of the camera from the housing holding the instruments.

DESCRIPTION OF THE SPECIFIC EMBODIMENT

Figure 1:
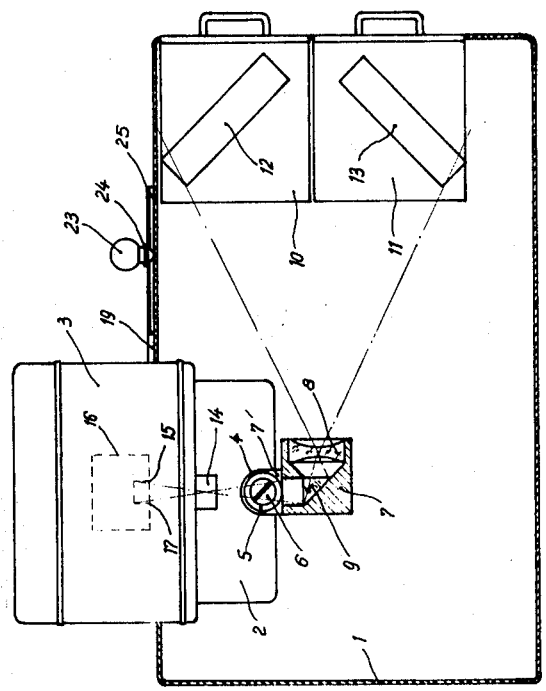
FIG. 1 illustrates schematically a longitudinal cross section.
Figure 2:
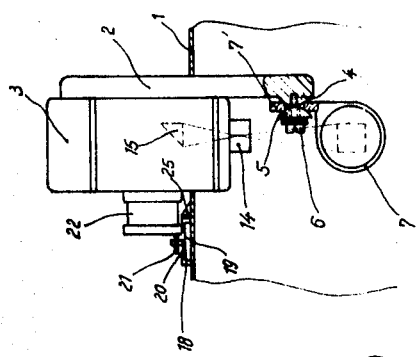
FIG. 2 illustrates schematically a partial transverse cross section of the arrangement.
Figure 3:
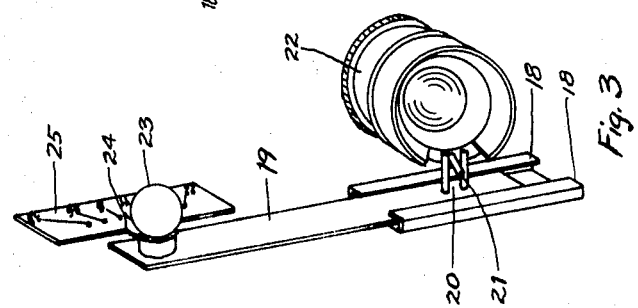
FIG. 3 is an isometric view of a subassembly.

In a housing 1 there is arranged a holder 2 in a manner such that it partly projects beyond the housing and is partly located in the interior of the housing 1. The holder 2 has a camera 3 secured thereto in a manner known per se and thus not shown. The camera 3 is equipped with automatic film advance and shutter winding. At the lower edge thereof the holder 2 is formed with a cup-shaped boss 4 having a likewise cup-shaped clamping piece 5 screwed thereto by means of a screw 6. A mount 7 provided with a lateral projection 7' contains a wide-angle lens 8 acting as auxiliary objective and a reflecting prism 9. The projection 7' of mount 7 has an opening 10 into which the cups 4 and 5 engage so that the projection 7' may be clamped between the two cups 4, 5 by tightening screw 6. With this type of mounting, the auxiliary objective 8 may be readily adjusted and arranged. In front of auxiliary objective 8, two inserts 10 and 11 are arranged in the housing 1, symmetrically to the optical axis of the auxiliary objective 8. Each of said inserts 10, 11 carries an indicating instrument 12, 13 disposed angularly with respect to each other and inclined to the optical axis. The instruments will be suitably illuminated by means (not shown).

The image of the indicating instruments 12, 13 formed by the auxiliary objective 8 is reflected into the image field 16 of the camera 3 as secondary image 17 via the reflecting prism 9 through a tube 14 of the camera 3 and a further reflecting prism 15.

Guide rails 18 are mounted in front of the camera 3 on the housing 1. A slide 19 is movably guided parallel to the camera 3 by rails 18. The slide 19 carries a fork 20 receiving an aperture-adjusting element 21 of the camera lens 22 between its prongs. Laterally of the camera 3, the slide 19 has a handle 23 and an indicator 24 cooperating with an aperture scale 25 readable from behind.

The camera 3 may be removed from the holder 2, for instance, for film replacement, the mount 7 with the auxiliary objective 8 remaining in the adjusted position in the housing 1. Moreover, removal of the camera 3 is also not hindered by the aperture-setting device 19–25, as the adjusting element 21 of the aperture may slide out of the fork 20. The adjustment of the aperture may be effected by the slide 19 and be read from behind on the scale 25. The inserts 10, 11 with the indicating instruments 12, 13 may be withdrawn laterally from the housing 1, so that the instruments 12, 13 are readily accessible and may be replaced, if necessary.

We claim:

1. In a photographic-monitoring device comprising a camera having a camera case within which is an image field and adapted to photograph the monitored object by means of a primary objective on the case defining a first light path entering the case to said field, having automatic film advance and shutter winding, said camera at the same time also photographing a secondary image of instruments, reflected into the image field by means of an auxiliary objective defining a second and separate light path into the body, said instruments being accommodated in a housing removably carrying the case of the camera, the improvement comprising:
   said auxiliary objective being a wide-angle lens having an optical axis;
   a lens mount holding said lens;
   a holder affixed to said housing;
   adjustable connecting means attaching said lens mount to said holder and positioning said lens so that its optical axis is generally horizontal; and
   mirror means positioned between said lens and the image field to direct light along a path from the lens to said field;

said camera case having a tube encircling said second path and forming an entrance for the light rays into the camera;

whereby when the camera case, with its primary objective, is removed from the housing the auxiliary objective remains with the housing in the previously established position.

2. In a device as set forth in claim 1, wherein said connecting means includes a lateral projection on said mount, said projection having an opening therethrough;

a pair of semispherical clamping elements; and a screw;

said elements being positioned on opposite sides of said projection with the projection being clamped therebetween by said screw.

3. In a device as set forth in claim 2, wherein said housing includes housing inserts each holding one of said instruments, said housing inserts and instruments being positioned such that the instruments are positioned symmetrically with respect to said optical axis and angularly with respect to each other.

4. In a device as set forth in claim 3 for use with a camera having an aperture-setting means and wherein said device includes;

a slide attached to said housing and movable laterally of said aperture-setting means, said slide having a fork operatively engaging said aperture-setting means whereby movement of the slide will change the aperture setting; and an aperture scale member and a pointer member, one of said members being affixed to the housing and one to the slide whereby the aperture setting can be read, said scale member being positioned laterally of the camera and so that the scale can be read from the rear of the camera.

5. In a device as set forth in claim 1 for use with a camera having an aperture-setting means and wherein said device includes;

a slide attached to said housing and movable laterally of said aperture-setting means, said slide having a fork operatively engaging said aperture-setting means whereby movement of the slide will change the aperture setting; and an aperture scale member and a pointer member, one of said members being affixed to the housing and one to the slide whereby the aperture setting can be read, said scale member being positioned laterally of the camera and so that the scale can be read from the rear of the camera.